(12) United States Patent
Arulandu et al.

(10) Patent No.: US 11,025,341 B2
(45) Date of Patent: Jun. 1, 2021

(54) LED MODULE FOR EMITTING SIGNALS

(71) Applicant: SIGNIFY HOLDING B.V., Eindhoven (NL)

(72) Inventors: Kumar Arulandu, Eindhoven (NL); Johan-Paul Marie Gerard Linnartz, Eindhoven (NL); Michel Germe, Eindhoven (NL); Amir Khalid, Eindhoven (NL); Olivia Qiu, Eindhoven (NL); David Derrien, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/621,100

(22) PCT Filed: Jun. 12, 2018

(86) PCT No.: PCT/EP2018/065434
§ 371 (c)(1),
(2) Date: Dec. 10, 2019

(87) PCT Pub. No.: WO2018/229022
PCT Pub. Date: Dec. 20, 2018

(65) Prior Publication Data
US 2020/0204256 A1    Jun. 25, 2020

(30) Foreign Application Priority Data

Jun. 13, 2017 (EP) ..................................... 17175736

(51) Int. Cl.
*H04B 10/116* (2013.01)
*H05B 45/40* (2020.01)
(Continued)

(52) U.S. Cl.
CPC ........... *H04B 10/116* (2013.01); *H05B 33/08* (2013.01); *H05B 45/305* (2020.01); *H05B 45/40* (2020.01); *H05B 47/19* (2020.01)

(58) Field of Classification Search
CPC combination set(s) only.
See application file for complete search history.

(56) References Cited

U.S. PATENT DOCUMENTS

| | | | | |
|---|---|---|---|---|
| 2006/0022214 A1* | 2/2006 | Morgan | .................. | H05B 45/22 257/99 |
| 2006/0056855 A1* | 3/2006 | Nakagawa | ............. | H05B 47/19 398/183 |

(Continued)

FOREIGN PATENT DOCUMENTS

| | | |
|---|---|---|
| CN | 105098037 A | 11/2015 |
| DE | 10214195 A1 | 10/2003 |

(Continued)

*Primary Examiner* — Omar S Ismail

(57) ABSTRACT

An LED module (200) comprising: a first set of LEDs (D1) for emitting illumination to illuminate an environment, arranged within a first circuit path; a second set of one or more LEDs (D2) for emitting light, arranged within a second circuit path; both the first and second sets being powered by a portion of the power received via a same pair of input terminals, and the first circuit path being longer than the second circuit path; and filter circuitry (206, 208) arranged to filter a modulation in the power received via the terminals, the filtering comprising allowing a component of the modulation at a predetermined modulation frequency to be passed only to the second set of LEDs (D2) and not the first set (D1), thereby causing a corresponding signal to be embedded in the light emitted by the second set but not in the illumination emitted by the first set.

13 Claims, 3 Drawing Sheets

(51) Int. Cl.
*H05B 33/08* (2020.01)
*H05B 47/19* (2020.01)
*H05B 45/305* (2020.01)

(56) References Cited

U.S. PATENT DOCUMENTS

| | | | | |
|---|---|---|---|---|
| 2009/0208221 | A1* | 8/2009 | Sasai | H04B 10/116 398/130 |
| 2010/0327764 | A1* | 12/2010 | Knapp | H04L 12/437 315/250 |
| 2010/0327766 | A1* | 12/2010 | Recker | H02J 9/02 315/291 |
| 2011/0069094 | A1* | 3/2011 | Knapp | G09G 3/2003 345/690 |
| 2011/0180687 | A1* | 7/2011 | Rains, Jr. | H05B 35/00 250/205 |
| 2012/0026726 | A1* | 2/2012 | Recker | F21V 21/0824 362/157 |
| 2013/0026927 | A1* | 1/2013 | Uhara | H05B 47/105 315/129 |
| 2013/0202310 | A1 | 8/2013 | Rietman et al. | |
| 2015/0016824 | A1* | 1/2015 | Roberts | H04B 10/1129 398/118 |
| 2016/0161599 | A1 | 6/2016 | Seliuchenko | |
| 2016/0294472 | A1* | 10/2016 | Palmer | H04B 7/0617 |
| 2016/0330825 | A1* | 11/2016 | Recker | H05B 47/19 |

FOREIGN PATENT DOCUMENTS

EP 1990936 A1 11/2008
EP 2002571 A1 12/2008

\* cited by examiner

LED MODULE FOR EMITTING SIGNALS

CROSS-REFERENCE TO PRIOR APPLICATIONS

This application is the U.S. National Phase application under 35 U.S.C. § 371 of International Application No. PCT/EP2018/065434, filed on Jun. 12, 2018, which claims the benefit of European Patent Application No. 17175736.2, filed on Jun. 13, 2017. These applications are hereby incorporated by reference herein.

TECHNICAL FIELD

The present disclosure relates to the use of LEDs to transmit signals embedded in the light emitted by the LEDs.

BACKGROUND

Visible light communication (VLC) refers to techniques whereby information is communicated in the form of a signal embedded in the visible light emitted by a light source. VLC is sometimes also referred to as coded light. The signal is embedded by modulating a property of the visible light, typically the intensity, according to any of a variety of suitable modulation techniques.

Coded light is often used to embed a signal in the light emitted by an illumination source such as an everyday luminaire, e.g. room lighting or outdoor lighting, thus allowing the illumination from the luminaires to double as a carrier of information. The light thus comprises both a visible illumination contribution for illuminating a target environment such as room (typically the primary purpose of the light), and an embedded signal for providing information into the environment (typically considered a secondary function of the light). In such cases, the modulation is typically performed at a high enough frequency so as to be beyond human perception, or at least such that any visible temporal light artefacts (e.g. flicker and/or strobe artefacts) are weak enough not to be noticeable or at least to be tolerable to humans. Thus the embedded signal does not affect the primary illumination function, i.e. so the user only perceives the overall illumination and not the effect of the data being modulated into that illumination. E.g. Manchester coding is an example of a DC free code, wherein the power spectral density goes to zero at zero Hertz, with very little spectral content at low frequencies, thus reducing visible flicker to a practically invisible level. Ternary Manchester is $DC^2$ free, meaning not only does the power spectral density go to zero at zero Hertz, but the gradient of the power spectral density also goes to zero, thus eliminating visible flicker even further.

Visible light communication (VLC) is becoming more and more popular as LED lighting systems are used in place of conventional lighting systems. WiFi systems are becoming more limited in bandwidth due their omnidirectional radiation pattern. WiFi signals can pass through walls, ceilings, doors etc. but their bandwidth reduces with the density and number of units that are used. Contrary to WiFi, LiFi (Light Fidelity) is directional and shielded by light blocking materials, which provides it with the potential to support higher bandwidth communication in a dense area of users as compared to WiFi.

SUMMARY

There is a problem with existing coded light emitting illumination devices (lamps or luminaires) in that the bandwidth is limited. There is thus a desire to increase the bandwidth available. One cause of such a limitation in bandwidth of conventional luminaires and lamps is due to the total impedance of the circuit path in which the LEDs are connected (both due to the number of LEDs and the amount of wire needed to connect them). The bandwidth could be increased by reducing the impedance of the circuit through which the current modulations corresponding to the VLC are carried. However, luminaires and lamps for conventional illumination purposes often comprise a significant number of LEDs in physically long circuit paths, which is a requirement in order to provide the desired illumination levels as well as the design of the LED layout. This introduces significant impedance.

The inventors have realised that by introducing filter circuitry into the LED module it is possible to reduce the impedance of a targeted subsection of the circuit, which can be used to emit the coded light modulation, and yet at the same time still maintain the total number of LEDs required for the illumination purposes by means of a longer subsection isolated at least partly by the filter.

According to one aspect disclosed herein, there is provided an LED module comprising: a pair of terminals for receiving power; a first set of multiple LEDs for emitting illumination to illuminate an environment, arranged within a first circuit path of the LED module and powered to emit said illumination by a portion of the power received via said terminals; a second set of one or more LEDs for emitting light, arranged within a second circuit path of the LED module and powered to emit said light by a portion of the power received via said pair of terminals, the first circuit path being longer than the second circuit path; and filter circuitry arranged to filter a modulation in the power received via said terminals; wherein the filter circuitry is configured to allow a component of said modulation at a predetermined modulation frequency to be passed only to the LEDs of the second set and not the LEDs of the first set, thereby causing a corresponding signal to be embedded in the light emitted by the second set but not in the illumination emitted by the first set.

Preferably the filter circuitry comprises at least a high pass filter, band pass filter or band stop filter connected in the second circuit path, arranged to substantially short-out the first, longer circuit path (and hence the first set of LEDs) for frequencies in an upper range comprising said predetermined frequency, e.g. a range from said predetermined frequency upwards (such that said predetermined frequency is a threshold). As another example however, the filter circuitry may alternatively or additionally comprise a band stop filter, pass band filter or low pass filter connected in the first circuit path to block said predetermined frequency.

In embodiments, the filter circuitry may be configured to: allow a first component of the modulation with a first, lower modulation frequency to be passed at least to the LEDs of the first set, thereby causing a corresponding first signal to be embedded in the emitted illumination; and allow a second component of the modulation with a second, higher frequency to be passed only to the second set of one or more LEDs and not the first set of LEDs, thereby causing a corresponding second signal to be transmitted via the light emitted by the second set but not the light emitted by the first set.

In embodiments, the first set of LEDs may be phosphor-converted LEDs, and the second set of LEDs may be non-phosphor-converted LEDs. E.g. the visible-spectrum LEDs may comprise white LEDs or phosphor converted blue LEDs.

In embodiments, the first set of LEDs may be visible-spectrum LEDs configured to emit visible-spectrum illumination, and the second set of LEDs may be infrared LEDs configured to emit infrared light.

In alternative embodiments it is not excluded that both the first and second sets of LEDs consist of visible spectrum LEDs (e.g. with the first set being phosphor converted and the second set being non-phosphor-converted, narrow-band LEDs, such as red, orange, yellow, green cyan, blue or violet LEDs). In yet further alternatives, only the second set of LEDs may be modulated, with the first (longer-path) set being arranged to only emit unmodulated illumination (being driven only with a DC current, with substantially all modulation being filtered out from the current driving the first set of LEDs).

In embodiments, the filter circuitry may be configured to allow the first, lower-frequency component to be passed to the first set of LEDs but not the second set of LEDs, such that the first signal is not transmitted via the light emitted by the second set.

In embodiments, the filter circuitry may be configured to allow the first, lower-frequency component to be passed to both the first and second sets of LEDs, such that the first signal is embedded in the illumination emitted by the first set of LEDs and transmitted via the light emitted by the second set of LEDs.

In embodiments, the visible-spectrum LEDs may be white LEDs.

According to another aspect disclosed herein, there is provided an illumination device comprising: the LED module; an LED driver arranged to supply said power; and a modulator coupled to the LED driver and arranged to introduce said modulation into the supplied power, the terminals of the LED module being connected to the modulator to receive the modulated power therefrom.

In embodiments, the modulator may be arranged to include the first and second components in said modulation at the same time such that the first and second signals are transmitted simultaneously.

In embodiments, the modulator may be arranged to include the second component in said modulation at a different time than the first component, such that the first and second signals are emitted on different occasions.

In embodiments, the modulator may be configured to continue supplying the second, higher-frequency component to the LED module when the illumination is switched off.

In embodiments, the modulator may be configured to use the visible-spectrum and infrared LEDs to implement an orthogonal frequency division multiplexing channel comprising a set of subcarriers, by using the visible spectrum LEDs to transmit a first, lower-carrier-frequency group of the subcarriers comprising the first signal, and using the infrared LEDs to transit over a second, higher-carrier-frequency group of the subcarriers comprising the second signal, the first and second signals being sub-signals of the orthogonal frequency division multiplexing channel.

In embodiments, the illumination device may take the form of a luminaire.

In embodiments, the illumination device may take the form of an individual lamp, being removably fittable into a luminaire.

According to another aspect disclosed herein, there is provided a system comprising the illumination device, including the LED module, and further comprising receiving equipment, wherein the receiving equipment comprises: a first light sensor for sensing visible-light modulations and a second light sensor for sensing infrared light modulations, wherein the first light sensor is capable of sensing a lower maximum modulation frequency than the second light sensor; and a decoder coupled to the one or more light sensors, the decoder being configured to decode the first signal from the sensed visible-light modulations and to decode the second signal from the sensed infrared light modulations.

In embodiments, the first light sensor may take the form of a camera for capturing images, whereas the second light sensor may take the form of a dedicated infrared data receiver.

That is, the first sensor (the visible light sensor) has another, primary function other than receiving the embedded data—namely capturing photographs. Whereas the second sensor (the IR sensor) is designed with the primary purpose of receiving data from an IR transmitter.

In embodiments the first light sensor, second light sensor and/or decoder may be implemented in a mobile user terminal such as a smartphone, tablet or wearable device.

The mobile user terminal may detect and capture coded light messages through a camera, and receive high bandwidth signals using a photodiode.

For instance, the camera may take the form of a rolling-shutter camera, e.g. as is often found in many mobile user terminals such as smartphones and tablets.

According to another aspect disclosed herein, there is provided a method comprising: receiving power at a pair of input terminals, the received power being modulated; using some of the power received via said terminals to power a first set of multiple LEDs to emit illumination to illuminate an environment; using some of the power received via said terminals to power a second set of one or more LEDs to emit light; and filtering a modulation in the power received via said terminals; wherein the filtering allows a component of said modulation at a predetermined modulation frequency to be passed only to the LEDs of the second set and not the LEDs of the first set, thereby causing a corresponding signal to be embedded in the light emitted by the second set but not in the illumination emitted by the first set.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
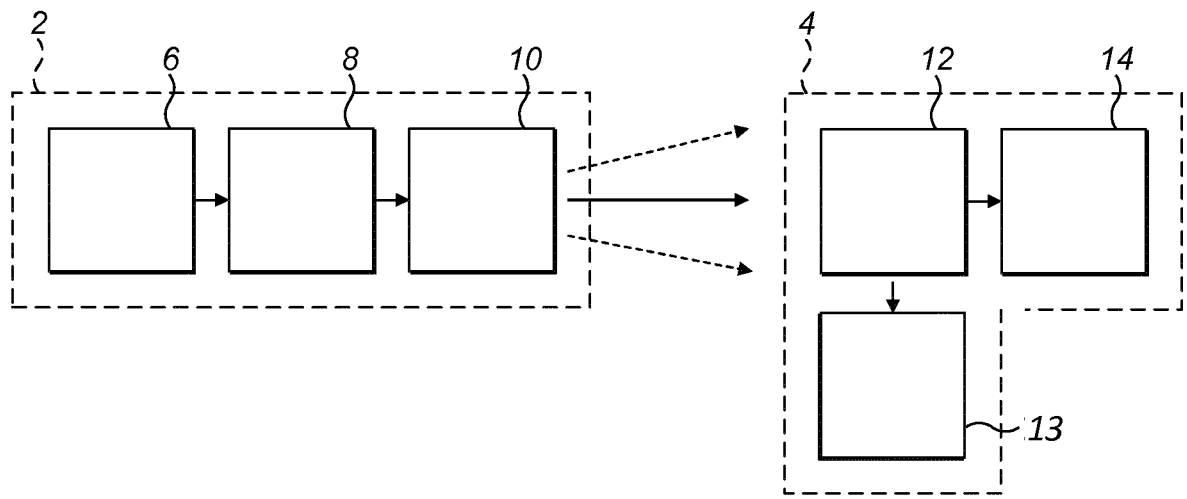
FIG. 1 shows a schematic diagram of an LED luminaire comprising LEDs capable of emitting coded light and a device comprising a sensor capable of sensing the coded light output by the LEDs.

As mentioned, there is a problem with existing coded light emitting illumination devices (lamps or luminaires) in that the bandwidth is limited due to the total impedance of the luminaire circuitry. The bandwidth can be increased by reducing the impedance of the circuit through which the coded light modulations are carried (i.e. through which the current corresponding to the coded light is carried). However, luminaires for conventional illumination purposes often comprise a significant number of LEDs in physically long circuit paths, which is a requirement in order to provide the desired illumination levels and design. This introduces a significant impedance. Also, these LEDs typically include phosphors which inhibit the ability to react to high frequency modulations.

The following discloses a circuit that, by introducing filter circuitry into the LED module, reduces the impedance of the circuit section which carries the coded light modulation, and yet still maintains the total number of LEDs required for the illumination purposes. That is to say by introducing this filter circuitry, a smaller set of LEDs comprised within the luminaire have directed to them the coded light modulated current, but not all of the LEDs of the luminaire are provided with this modulated current comprising the coded light signal. In this way the modulations comprising the coded light signal in question only travel around a circuit loop comprising the smaller set of LEDs, and not a larger circuit loop comprising all the LEDs of the LED module. Thus the modulations in the circuit section comprising the smaller set of LEDs experience a lower impedance than would otherwise have been present, and are capable of carrying modulations having a higher frequency and providing a higher bandwidth.

In embodiments, this may be extended to include two different coded light signals having two different modulation frequencies. In this case the higher frequency modulated current may be directed towards the shorter circuit path, and the lower frequency modulated current may be directed towards the longer circuit path. That is to say that the longer circuit path may also carry a coded light signal embedded in current modulations, but the frequency of the modulations are of a lower frequency and as such are influenced by the impedance of the longer circuit path to a lesser degree than the higher frequency modulation.

Conventionally visible light communication can only be used while the light providing the visible illumination is switched on. Also as high speed visual light communication through conventional LED engines comes with limitations such as the transmission of high frequency signals along long circuit lengths, it would be desirable to provide a design of LED module (e.g. LED board) that includes the visible and infrared LEDs. This is also desirable to be provided in a manner that incorporates readily into an existing lamp or luminaire design with little or no modification to the rest of the lamp or luminaire.

The present disclosure provides a lighting device apparatus to overcome these problems by adding infrared LEDs as well as filter circuitry to an otherwise conventional luminaire. In this way high frequency communication is enabled and communication is sustained even when the visible illumination is switched off. Furthermore, this solution improves the possibilities for high frequency design as high frequency signals are guided only toward high frequency infrared LEDs. The LED module comprising the filter circuitry required to implement these features may be configured to be added to the drive source (and at least some of the modulation circuitry) in a modular fashion, such that a source which is already available and found within conventional luminaires may be used substantially without modification to the source. That is, the module enables an additional high frequency modulation component to be added to an otherwise conventional luminaire with little or no modification to the existing driver and modulation hardware.

Visible light communication (VLC) can only be used while the lamps providing the visible illumination are switched on (emitting light). This means that any coded light and information to be transmitted by such visible light emitting lamps cannot be transmitted or received when the luminaire is switched off. To address this, infrared LEDs can be added to otherwise conventional luminaires. As the wavelength of IR light is shorter than that of visible light, the potential for high frequency modulations within coded light is substantially increased, as is the potential data link speed and available bandwidth.

There is also potential for significant energy transfer inefficiency in conventional luminaires when using high frequency modulations. This can arise from the high load of cooling areas such as copper cooling areas incorporated into conventional luminaires, as well as any defects in the printed circuit board. Embodiments disclosed herein separate the infrared high frequency modulation circuit path from the visible-spectrum low frequency modulation circuit path, which advantageously reduces the potential for defects along the short path for the high frequency signals. The energy transfer can still be inefficient (which can deteriorate the electromagnetic compatibility performance at high frequency current modulations), but this can be addressed by incorporating impedance matching circuits.

Visible light communication (VLC) refers to techniques whereby information is communicated in the form of a signal embedded in the visible light emitted by a light source. VLC is sometimes also referred to as coded light.

The signal is embedded by modulating a property of the visible light, typically the intensity, according to any of a variety of suitable modulation techniques. In some of the simplest cases, the signalling is implemented by modulating the intensity of the visible light from each of multiple light sources with a single periodic carrier waveform or even a single tone (sinusoid) at a constant, predetermined modulation frequency. If the light emitted by each of the multiple light sources is modulated with a different respective modulation frequency that is unique amongst those light sources, then the modulation frequency can serve as an identifier (ID) of the respective light source or its light.

In more complex schemes a sequence of data symbols may be modulated into the light emitted by a given light source. The symbols are represented by modulating any suitable property of the light, e.g. amplitude, modulation frequency, or phase of the modulation. For instance, data may be modulated into the light by means of amplitude keying, e.g. using high and low levels to represent bits or using a more complex modulation scheme to represent different symbols. Another example is frequency keying, whereby a given light source is operable to emit on two (or more) different modulation frequencies and to transmit data bits (or more generally symbols) by switching between the different modulation frequencies. As another possibility a phase of the carrier waveform may be modulated in order to encode the data, i.e. phase shift keying.

In general the modulated property could be a property of a carrier waveform modulated into the light, such as its amplitude, frequency or phase; or alternatively a baseband modulation may be used. In the latter case there is no carrier waveform, but rather symbols are modulated into the light as patterns of variations in the brightness of the emitted light. This may for example comprise modulating the intensity to represent different symbols, or modulating the mark:space ratio of a pulse width modulation (PWM) dimming waveform, or modulating a pulse position (so-called pulse position modulation, PPM). The modulation may involve a coding scheme to map data bits (sometimes referred to as user bits) onto such channel symbols. An example is a conventional Manchester code, which is a binary code whereby a user bit of value 0 is mapped onto a channel symbol in the form of a low-high pulse and a user bit of value 1 is mapped onto a channel symbol in the form of a high-low pulse. Another example coding scheme is the so-called Ternary Manchester code developed by the applicant.

Based on the modulations, the information in the coded light can be detected using any suitable light sensor. This can be either a dedicated photocell (point detector), or a camera comprising an array of photocells (pixels) and a lens for forming an image on the array. E.g. the camera may be a general purpose camera of a mobile user device such as a smartphone or tablet. Camera based detection of coded light is possible with either a global-shutter camera or a rolling-shutter camera. E.g. rolling-shutter readout is typical to mobile CMOS image sensors found in everyday mobile user devices such as smartphones and tablets). In a global-shutter camera the entire pixel array (entire frame) is captured at the same time, and hence a global shutter camera captures only one temporal sample of the light from a given luminaire per frame. In a rolling-shutter camera on the other hand, the frame is divided into lines in the form of horizontal rows and the frame is exposed line-by-line in a temporal sequence, each line in the sequence being exposed at a slightly later time than the last. Each line therefore captures a sample of the signal at a different moment in time. Hence while rolling-shutter cameras are generally the cheaper variety and considered inferior for purposes such as photography, for the purpose of detecting coded light they have the advantage of capturing more temporal samples per frame, and therefore a higher sample rate for a given frame rate. Nonetheless coded light detection can be achieved using either a global-shutter or rolling-shutter camera as long as the sample rate is high enough compared to the modulation frequency or data rate (i.e. high enough to detect the modulations that encode the information).

Coded light can be used to embed a signal in the light emitted by an illumination source. Thus the illumination from the luminaires is able to double as a carrier of information. The light comprises both a visible illumination contribution, and an embedded signal. In such cases, the modulation is typically performed at a high enough frequency so as to be beyond human perception. In this way the embedded signal does not affect the primary illumination function of the illumination source. The user only perceives the overall illumination and not the effect of the data being modulated into that illumination.

Thus coded light has various commercial applications in the home, office or elsewhere, such as a personalized lighting control, indoor navigation, location based services, or providing a data transfer channel, etc.

As mentioned above, coded light can be detected using an everyday "rolling shutter" type camera, as is often integrated into an everyday mobile user device like a mobile phone or tablet. In a rolling-shutter camera, the camera's image capture element is divided into a plurality of horizontal lines (i.e. rows) which are exposed in sequence line-by-line. That is, to capture a given frame, first one line is exposed to the light in the target environment, then the next line in the sequence is exposed at a slightly later time, and so forth. Each line therefore captures a sample of the signal at a different moment in time (typically with the pixels from each given line being condensed into a single sample value per line). Typically the sequence "rolls" in order across the frame, e.g. in rows top to bottom, hence the name "rolling shutter". When used to capture coded light, this means different lines within a frame capture the light at different moments in time and therefore, if the line rate is high enough relative to the modulation frequency, at different phases of the modulation waveform. Thus the rolling-shutter readout causes fast temporal light modulations to translate into spatial patterns in the line-readout direction of the sensor, from which the encoded signal can be decoded.

More generally, coded light can be detected using any sensor able to detect the intensity of light falling upon it. For example a dedicated photocell (point sensor) may be used to detect modulations in light such that a code embedded within the light is received. Also, infrared (IR) light signals may be detected using technologies similar to any of those discussed above, but adapted to detect IR instead of (or as well as) visible light. For instance, IR signals may be detected an IR-sensitive photocell, or using an IR camera. In the latter case, this may be achieved in the same manner as the rolling shutter camera discussed above, or in a global shutter type camera wherein each of the sensors/pixels forming the image are exposed to the coded light (visible or infrared) at the same instance in time. The change in intensity measured by the same pixel/sensor over time enabling the receiving of the coded light signal.

FIG. 1 gives a schematic overview of a system for transmitting and receiving coded light. The system comprises a transmitter 2 and a receiver 4. For example the transmitter 2 may take the form of a luminaire, e.g. mounted on the ceiling or wall of a room, or taking the form of a free-standing lamp, or an outdoor light pole. The receiver 4 may for example take the form of a mobile user terminal such as a smart phone, tablet, laptop computer, smartwatch, or a pair of smart-glasses.

The transmitter 2 comprises a light source 10 and a driver 8 connected to the light source 10. In the case were the transmitter 2 comprises a luminaire, the light source 10 takes the form of an illumination source (i.e. lamp) configured to emit illumination on a scale suitable for illuminating an environment such as a room or outdoor space, in order to allow people to see objects and/or obstacles within the environment and/or find their way about. The illumination source 10 may take any suitable form such as an LED-based lamp comprising a string or array of LEDs. The transmitter 2 also comprises an encoder 6 coupled to an input of the driver 8, for controlling the light source 10 to be driven via the driver 8. Particularly, the encoder 6 is configured to control the light source 10, via the diver 8, to modulate the illumination it emits in order to embed a cyclically repeated coded light message. Any suitable known modulation technique may be used to do this. In embodiments the encoder 6 is implemented in the form of software stored on a memory of the transmitter 2 and arranged for execution on a processing apparatus of the transmitter (the memory on which the software is stored comprising one or more memory units employing one or more storage media, e.g. EEPROM or a magnetic drive, and the processing apparatus on which the software is run comprising one or more processing units). Alternatively it is not excluded that some or all of the encoder 6 could be implemented in dedicated hardware circuitry, or configurable or reconfigurable hardware circuitry such as a PGA or FPGA.

The receiver 4 comprises a camera 12 and a coded light decoder 14 coupled to an input from the camera 12 in order to receive images captured by the camera 12. The receiver 4 also comprises a controller 13 which is arranged to control the exposure of the camera 12. In embodiments, the decoder 14 and controller 13 are implemented in the form of software stored on a memory of the receiver 4 and arranged for execution on a processing apparatus of the receiver 4 (the memory on which the software is stored comprising one or more memory units employing one or more storage media, e.g. EEPROM or a magnetic drive, and the processing apparatus on which the software is run comprising one or more processing units). Alternatively it is not excluded that some or all of the decoder 14 and/or controller 13 could be implemented in dedicated hardware circuitry, or configurable or reconfigurable hardware circuitry such as a PGA or FPGA. In embodiments the camera 12 may be a light sensor, where no image is recorded as such. That is to say the sensor may not be the sensor of a camera which results in all or part of an image being created, but may simply be a light sensor for the purposes for sensing an ambient light level and detecting coded light.

The encoder 6 is configured to perform the transmit-side operations in accordance with embodiments disclosed herein, and the decoder 14 and controller 13 are configured to perform the receive-side operations in accordance with the disclosure herein. Note also that the encoder 6 need not necessarily be implemented in the same physical unit as the light source 10 and its driver 8. In embodiments the encoder 6 may be embedded in a luminaire along with the driver and light source. Alternatively the encoder 6 could be implemented externally to the luminaire 4, e.g. on a server or control unit connected to the luminaire 4 via any one or more suitable networks (e.g. via the internet, or via a local wireless network such as a Wi-Fi or ZigBee, 6LowPAN or Bluetooth network, or via a local wired network such as an Ethernet or DMX network). In the case of an external encoder, some hardware and/or software may still be provided on board the luminaire 4 to help provide a regularly timed signal and thereby prevent jitter, quality of service issues, etc.

Similarly the coded light decoder 14 and/or controller 13 are not necessarily implemented in the same physical unit as the camera 12. In embodiments the decoder 14 and controller 13 may be incorporated into the same unit as each other, e.g. incorporated together into a mobile user terminal such as a smartphone, tablet, smartwatch or pair of smart-glasses (for instance being implemented in the form of an application or "app" installed on the user terminal). Alternatively, the decoder 14 and/or controller 13 could be implemented on an external terminal. For instance the camera (or other suitable light sensor) 12 may be implemented in a first user device such as a dedicated camera unit, light meter unit, or mobile user terminal like a smartphone, tablet, smartwatch or pair of smart glasses; whilst the decoder 14 and controller 13 may be implemented on a second terminal such as a laptop, desktop computer or server connected to the camera 12 on the first terminal via any suitable connection or network, e.g. a one-to-one connection such as a serial cable or USB cable, or via any one or more suitable networks such as the Internet, or a local wireless network like a Wi-Fi or Bluetooth network, or a wired network like an Ethernet or DMX network.

Visible light communication is becoming increasingly popular as LED lighting systems take over from conventional lighting systems. WiFi systems are also becoming more noticeably limited in their bandwidth due to increasing data volume demands and WiFi's inherent omnidirectional radiation pattern. WiFi signals can pass through walls, ceilings, doors etc. and the bandwidth reduces with the density of and number of units that are used. However, unlike WiFi, LiFi is highly directional and can be shielded by any light blocking materials. Because of these differences LiFi has the potential to support higher bandwidth communications in a dense area of users compared to WiFi networks. That is because light waves themselves are directional (easy to focus with lenses) and are easily blocked by infrastructure (unless it is transparent). Due to these properties of light, communication through light can be more dense with less chance of interference of neighbouring LiFi interfaces compared to WiFi. WiFi has an omnidirectional radiation pattern that easily passes through solid materials. If the number of devices which use WiFi starts to increase in density in a small area, the bandwidth will drop as all devices are using the same medium. Adding multiple access points will not overcome the problem in as the available bandwidth will remain the same resulting in WiFi devices needing to apply a time division communication scheme (wait for a free timeslot to communicate). Resulting in within such a dense area the total bandwidth of the medium needing to be shared amongst the number of WiFi devices.

Within the various applications which use visual light communication, data rates can range from those needed for indoor positioning, typically a low bit rate in the range of 2 kbps-10 kbps, to data rates used by LiFi which can reach up to anywhere from 40 Mbps to several Gbps. Low frequency data modulation may be required for applications such as indoor positioning so that ease of detection through smartphone cameras can be achieved. Whilst LiFi (like WiFi where a RF (radio frequency) signal is replaced by light modulation) uses comparatively high data rates and thus requires LiFi dongles. It can be assumed that once LiFi takes a bigger market share, LiFi dongles may also be embedded into smartphones, laptops and other user devices.

The geometry of luminaires can be quite diverse. When considering high frequency modulations within the illumination and stylistic design remits of a luminaire, the physical size of the circuit to be used is best kept at a minimum. As a result designing a luminaire and accompanying circuit which both optimizes the high frequency modulation capabilities and provides illumination with an attractive, unique, or desirable configuration can become very complicated. By providing a separate circuit path for higher frequency modulated signals providing higher bandwidths, the physical size of the circuit to be used for illumination (and in embodiments a lower frequency modulated signal), can be as long and as complicated as it needs to be to provide the desired illumination without having to also be optimized for higher frequency modulation capabilities.

LED luminaires are particularly suited to functioning as LiFi access points for providing connections with computer networks. However, when the visible light is switched off, the data emission is terminated. Furthermore, the LEDs that are currently used for general lighting are typically phosphor converted white LEDs. These LEDs employ blue or near-ultraviolet emitting chips and typically use a coating of yellow phosphor to convert the light emitted to white light. Such LEDs have good colour temperature properties and colour rendering index properties. However, the phosphor causes a delayed response between the received drive current (power) modulations and the emitted light modulations such that a damping effect is observed, which further limits the achievable communication speeds if using these LEDs for LiFi.

Other limitations typically present within existing LiFi technologies stem from the components used such as wiring, PCB traces and interconnections (i.e. parasitic capacitances) within the luminaire. These defects and inefficiencies can become critical at higher modulation frequencies as they increase the load and the impedance of the circuit. LED boards are normally optimized for thermal, optical and insulating properties. However, the copper areas used for cooling will deteriorate the electromagnetic compatibility (EMC) performance at the higher frequencies used for VLC.

LEDs have decreased in price by a significant amount in recent years, and appear set to continue to do so. Thus the incorporation of more diverse types and greater numbers of LEDs into single lighting units no longer comes up against the same cost barriers it may have in the recent past. In light of this consideration no longer being such an imposing restriction on luminaire design, incorporating LEDs whose purpose is not solely for illumination is a more acceptable idea.

Hence embodiments disclosed herein provide a hybrid LED board with impedance matching circuit that consists of additional infrared LEDs and passive components that guide the high frequency signals through an alternative and shorter circuit path for a high frequency signal, rather than the longer circuit path (in embodiments comprising phosphor converted LEDs) for visible lighting and in embodiments lower frequency modulation. Such a circuit overcomes all of the above described restrictions and limitations previously needing to be considered when designing LiFi luminaires for coded light communication.

That is to say, a higher data rate will be enabled by using filter circuitry to direct higher frequency modulations though a shorter circuit path including only a subset of the total number of LEDs of the luminaire, and an improved electromagnetic emission (EME) of the luminaire is achieved. In embodiments both a high and low data rate modulation is enabled through different LEDs acting as light sources in different circuit paths. It is also noted that by using a number of infrared LEDs communication can be maintained even when the visible light is switched off.

Figure 2:
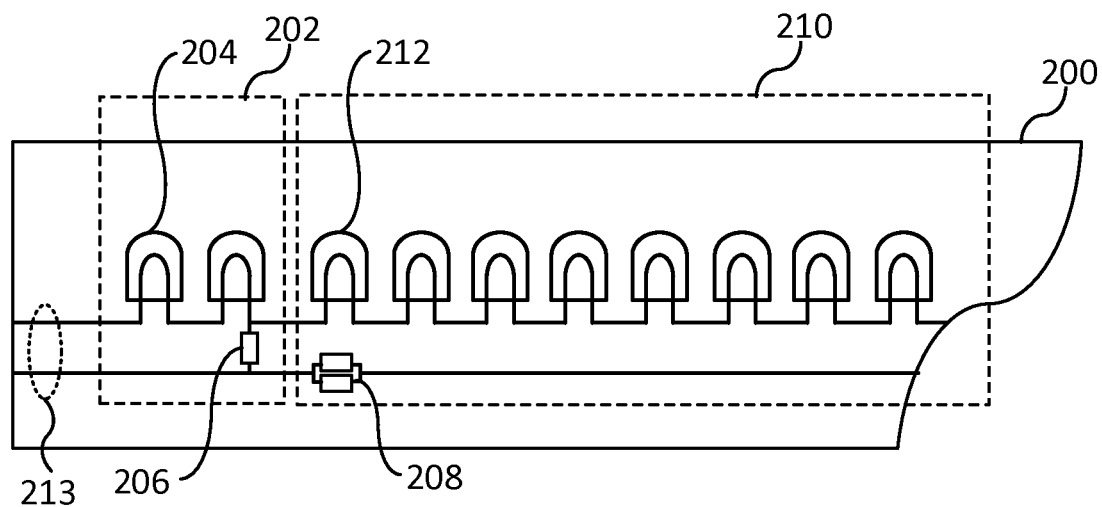
FIG. 2 shows a schematic diagram of an example LED board of the luminaire of FIG. 1.

FIG. 2 shows an example of an LED module 200, e.g. in the form of an LED board, which includes an example filter implementation for achieving any one or more of the above described advantages.

The LED board 200 comprises a first set of LEDs 210 consisting of one or more visible spectrum LEDs 212 and second set of LEDs 202 consisting of one or more infrared LEDs 204. The present invention is described in reference to FIG. 2 by way of example, and although FIG. 2 shows both infrared and visible-spectrum LEDs, it is just one embodiment of the present invention, and not a requirement that the LED module comprise two different types of LED. Nor is it a requirement that modulation circuitry be capable of embedding two coded light signals at two different modulation frequencies, or that any coded light signal is passed to the LEDs of the longer circuit path.

As will be familiar to a person skilled in the art, LEDs emit light within a target region of the EM spectrum. Therefore visible-spectrum LEDs emit light only in the visible spectrum or at least substantially only in the visible spectrum, and infrared LEDs emit infrared light only. A visible spectrum LED may be a white LED employing phosphors to emit over a range of wavelengths across the visible spectrum (but not outside or at least not substantially outside the visible spectrum). Alternatively a visible spectrum LED may be a specific colour emitting only a particular narrowband wavelength, e.g. red, green or blue.

Both sets of LEDs 202, 210 are connected to receive a modulated drive current supplied via the same pair of input terminals 213, and hence to be powered to emit their respective light by means of the same pair of input terminals 213. A terminal refers to any point in a circuit where one part connects with another. It does not necessarily limit to an external connection or removable connector of any kind (though those are possibilities). More simply a terminal could simply be the end of a wire or an internal connection within a circuit.

This drive current is modulated with at least two data signals at different frequencies, e.g. different carrier frequencies if a carrier modulation is used, or different symbol rates if a baseband modulation is used. The two signals may be superimposed (modulated into the drive current simultaneously), or alternatively different ones of the two signals may be modulated into the drive current on different occasions. The LED board further comprises filter circuitry 206, 208 connected such that the visible LEDs 212 only receive the lower frequency signal, whilst the infrared (IR) LEDs 204 receive at least the higher frequency signal. In embodiments the infrared LEDs 204 may receive both the low frequency signal and the high frequency signal. That is to say, the high frequency signal is passed to the LEDs of 202, while the low frequency signal passes through the entire set of LEDs (202 and 210).

Modulating the drive current (power) at both high and low frequencies through the IR LEDs is thus possible while only modulating the drive current at a low frequency through the white LEDs. Section 202, shown outlined by a dashed line, comprises the infrared (IR) LEDs 204. These IR LEDs 204 may receive a combination of the high frequency modulations passed by a high-pass filter 206 and the low frequency modulations passed by a band-stop filter 208. Thus the modulation of the drive current (power) as received by the infrared LEDs 204 contains both a high frequency modulation and a low frequency modulation. The configuration of the filters 206 and 208 of FIG. 2 allows the circuit path length for the high frequency modulation to be kept short, optimizing its transmission within the circuit.

Section 210, shown outlined by a dashed line, comprises the infrared visible-spectrum LEDs 212. The band-stop filter 208 allows the low frequency modulated signal to pass on to the visible-spectrum LEDs 212. The visible-spectrum LEDs 212 are thus positioned within a larger branch of the circuit which may be increased in size and manipulated to suit many illumination designs and configurations, causing minimal corollary effects on the high frequency modulations output at the infrared LEDs. The low frequency modulation is also passed to the short circuit path forming part of the high frequency modulation circuit path, such that both the high frequency modulation and the low frequency modulation are received at the infrared LEDs.

As can be seen, a first, longer circuit path comprises a serial arrangement of the first set of LEDs 212 is connected in in series with the band stop filter 208. The high pass filter 206 is connected in a parallel arrange, comprising the high pass filter 206 connected in parallel with the series arrangement of the first LED group 210/212 and band stop filter 208. This whole parallel arrangement is connected in series with the second, shorter circuit path comprising the second set of LEDs 204. The overall arrangement is connected between the two input terminals 213.

This means the high pass filter 206 is connected so as to effectively short-out the first, longer circuit path from the perspective of any high frequency AC current components above the threshold of the high-pass filter 206. The cut-off frequency of the high pass filter 206 is a matter of design choice depending on the application and the design of the visible spectrum part 210 of the lamp or luminaire. Another type of filter such as a band pass filter could also be used here in place of the high pass filter 206. The stop band filter 208 in the first, longer circuit path blocks all but a desired frequency of AC current component from passing through the first, longer circuit path. Again the selected frequency is a matter of design choice depending on the application and the design of the visible spectrum part 210 of the lamp or luminaire. Also, another filter such as a low pass filter could be used in place of the stop band filter 208. Further, in embodiments only one of the two filters 206, 208 need be included, though both are preferred for a "belt and braces" approach.

In embodiments, should the illumination provided by the visible-spectrum LEDs be turned off (no longer emitted), the low frequency modulated signal may still be transmitted by the infrared LEDs such that it may still be received by a suitable sensor. E.g. one such method is to short circuit the LEDs 212 for illumination such that visible light is no longer emitted but the DC power and high frequency modulation coded light signal are still passed on to the infrared LEDs 204 so as to emit the high frequency signal.

The circuit design shown in FIG. 2 illustrates how the path length of the high frequency modulated signal is kept as small as possible. This increases the ability to maintain a good quality high frequency signal modulation by keeping the impedance of the circuit path at a minimum as well as reducing the likelihood and number of circuit defects along the circuit path. As such the high frequency modulation is interfered with as little as possible by circuit load and defects.

The illustrated infrared LED configuration 202 also avoids limiting the configuration of the visible-spectrum LEDs 210 used to provide illumination. The fact that the configuration of the infrared LEDs 202 will have less impact with regard to the user perceived illumination (as the infrared light is not visible to the human eye), allows for the configuration of the infrared LEDs 202 to be designed to a particular desired specification without impacting the illumination function of the luminaire. That is to say the circuit design eases luminaire design for inclusion of high frequency coded light as a defined short current path for high frequency and separated longer path for illumination (and in embodiments low speed data and a low frequency modulated current) gives freedom to account for design of the illumination and thermal properties of the LEDs.

This circuit design also enables high and low frequency modulated signals to coexist within the same LED board without interference, thereby allowing most of the LED board to be shared by both frequency signals and utilizing only separate modulation electronics for driving each of the infrared LEDs and phosphor converted blue LEDs. In this way a hybrid LED engine is created (including both infrared light and visible light), which can be modular in implementation to allow for easy conversion of a conventional luminaire into one capable of providing higher bandwidth coded light, and in embodiments also providing infrared coded light functions.

Figure 3:
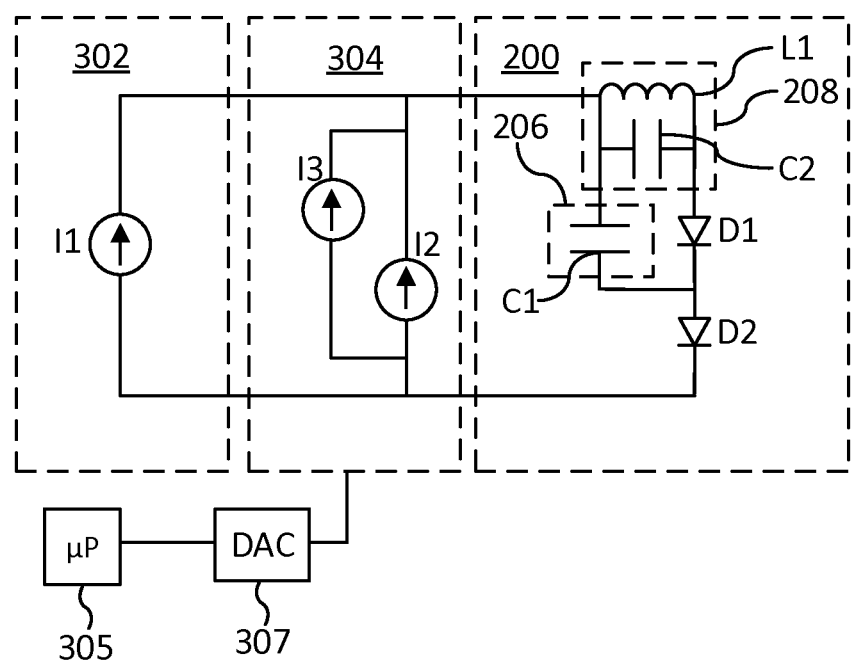
FIG. 3 shows a schematic diagram depicting an example circuit diagram for the circuit design for the luminaire of FIG. 1.

FIG. 3 shows an example circuit diagram of the example filter implementation of FIG. 2, and further includes example circuitry for providing a drive current and modulating a coded light signal into the current. In embodiments the components 302, 304, 200 of FIG. 3 may be incorporated into the housing of a luminaire or even an individual lamp. As shown in FIG. 3, a conventional LED driver 302 (I1) is configured to generate a constant drive current I1 (e.g. 0.7 Ampere), and is connected to the modulator 304. The modulator 304 comprises a further current source configured to add a first modulation current component I2 having a first modulation frequency to the drive current I1 generated by the LED driver 302, corresponding to a visible light communication (VLC) signal (e.g. Li-Fi signal) to be emitted by the LED module 200. The modulator 304 also adds a second modulated current component I3 having a second, higher modulation frequency intended for infrared communication. Thus the modulator 304 thus outputs a modulated drive current I1=I2+I3 comprising at least a first component I2 having a lower frequency modulation, and a second component I3 having a higher frequency modulation.

The modulator 304 may be configured to include the modulations in the drive currents I1 and I2 by any suitable controller 305, e.g. a microcontroller. This may be incorporated into the modulator 304, or external to it (the modulator being configured to perform the modulations by being connected to the controller 305). The controller 305 may be configured to control the modulator 304 to include the modulations in the driver current simultaneously, so that the modulations are superimposed in the current as flowing through the input terminals 213 of the LED module. Alternatively, the controller 305 controls the first and second modulation components I2, I3 to be included in the drive current passed through the input terminals 213 at mutually different times. Either way, the filter circuitry 206, 208 in the LED module 200 then ensures that substantially only the lower frequency modulations I2 are passed to the circuit section 210 (i.e. the visible light LEDs 212) whilst at least the higher frequency component I3 is passed to the circuit section 202 (i.e. the infrared LEDs 204).

The controller 305 is arranged to control the two modulated current sources, so as to control the generation of I2 and I3 respectively, via DAC circuitry 307. This may comprise two individual DAC, one for each current source, i.e. so a separate digital signal is signaled from the controller 205 for the high and low frequencies. Alternatively the DAC circuitry 307 may consist of only a single DAC, with analog filtering being used to separate the high and low frequency with some guard intervals to cover the roll-off of the filters. In embodiments the DAC circuitry 307 may comprise more than two DACs.

The modulated current, comprising the components corresponding to the two coded light signals, is then outputted to the LED board 200 comprising the LEDs 204, 212.

The LED board 200 comprises mainly visible-spectrum LEDs, e.g. regular white LEDs, red LEDs, green LEDs, blue LEDs, etc. (D1). A single LED D1 is shown here for illustrative purposes but in reality any number of LEDs may be incorporated to provide the required illumination depending upon the design and the purpose of the particular luminaire. These LEDs D1 (212) are intended to emit light for illumination purposes and emit low frequency modulated illumination that contains data (for example this could be coded light for indoor positioning purposes, or other low data rate signals). In addition, the LED board contains infrared LEDs D2 (204) that are intended to be modulated at a high frequency to enable high data rates. A single LED D2 is shown here for illustrative purposes, but in reality any number of infrared LEDs may be incorporated to provide the required intensity of infrared light to support the high data rate functionality as required depending upon the design and the purpose of the particular luminaire.

Furthermore, the LED board 200 contains filters that are frequency dependent such that high frequency current signals are only passed through a small portion of the LED board while the low frequency current signals are passed through the visible-spectrum LEDs, and in embodiments the non-visible LEDs as well. These filters are implemented through various components such as capacitors, inductors, and resistors etc. (in this example circuit diagram by components labelled L1, C1, and C2). In this example capacitor C1 is used to provide the high pass filter 206, and capacitor C2 and inductor L1 are used to provide the band stop filter 208. The various components required to implement the various types of filter within a circuit are known in the art. The placement and configuration of these components and filters and the surrounding circuitry provided the filtering according to embodiments disclosed herein, but it will be appreciated this is just one example and the desired effect can be implemented in a circuit using various alternative arrangement. The art of filter design is known to the skilled person, who would be able to build a filter circuit having a desired effect once given a brief to do so.

By separating the frequencies, the modulation frequencies that can be successfully transmitted can be increased through the infrared LEDs and the high frequency signals can be guided through a short high frequency specific path. Additionally, as only low frequency signals pass through the visible-spectrum LEDs, the circuit design aspects such as positioning of LEDs, interconnections between LEDs, and copper areas for cooling purposes, are simplified as they are only subjected to those low frequencies.

Figure 4A:
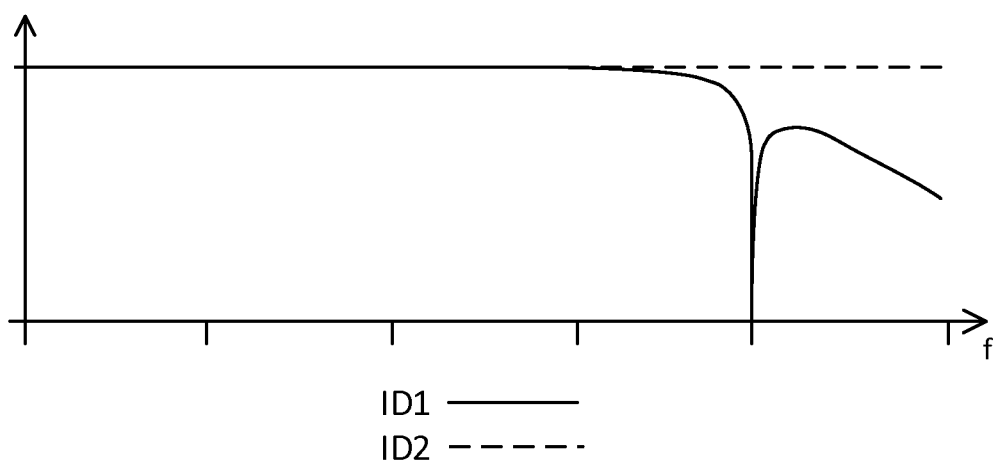
FIG. 4A shows a graph of the frequency response of LED current through an Infrared LED and visual-spectrum (e.g. white phosphorous) LED as incorporated into the luminaire of FIGS. 1 to 3.
Figure 4B:
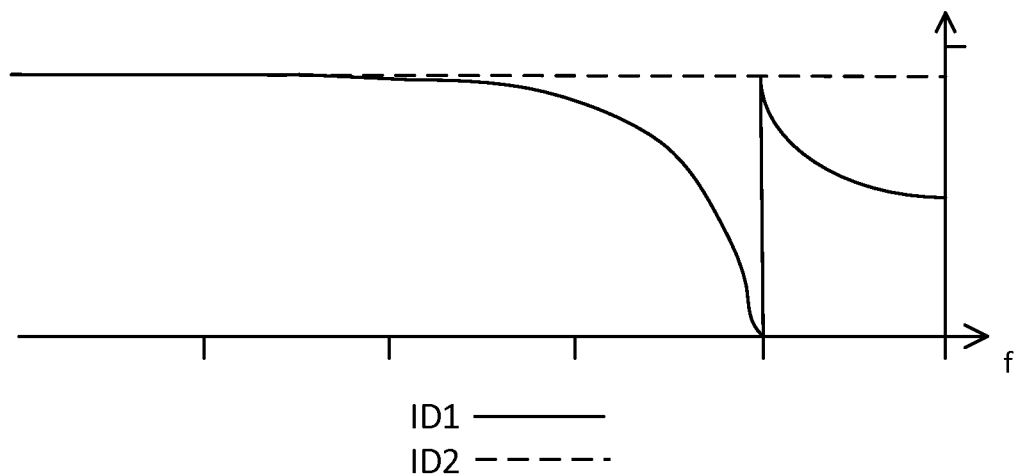
FIG. 4B shows a graph of the transfer function of LED current through an Infrared LED and a visual-spectrum (e.g. white phosphorous) LED as incorporated into the luminaire of FIGS. 1 to 3, and FIG. 5 schematically illustrates an orthogonal frequency division multiplexing (OFDM) transmission scheme.

FIGS. 4A and 4B show the frequency response and transfer function respectively of LED current though the infrared LED (D2) and visible-spectrum (white) LED (D1). In FIG. 4A the vertical axis represents current on a logarithmic scale spanning from about −50 dBdB at the bottom of the illustrated range to about 0 dB at the top, and the horizontal axis represents frequency response on a logarithmic scale from about 1 kHz on the left of the illustrate range to 100 MHz on the right. In FIG. 4B the vertical axis represents phase on a linear scale spanning from about −180 degrees at the bottom of the illustrated range to about +20 degrees at the top, and the horizontal axis represents frequency response on a logarithmic scale from about 1 kHz on the left of the illustrate range to 100 MHz on the right.

As shown in FIG. 4A, all frequencies are passed through the infrared LED (D2) without any attenuation. Whereas it can be seen that the higher frequencies are attenuated through the visible-spectrum (white) LEDs (D1).

FIGS. 4A and 4B show the output resulting from including a band-stop or notch filter in the circuit design having a characterizing frequency of 10 MHz. It should be understood that the design of the filters can be optimized in various ways for different applications. For example any type of filter that is applicable for the long string of LEDs receiving the low frequency signal (i.e. visible light), e.g. low pass, band-pass, band-stop, notch, etc. As well as any type of filter for the short string of LEDs intended for the high frequency signal (IR LEDs), e.g. band-pass, notch, high-pass, etc. The low pass filter is for passing the low frequency signal, and the high pass filter is for passing the high frequency signal, in order to separate the signals to the specific LED sets. The above mentioned band-pass filters can be used for the same selecting between frequencies, but also for filtering out disturbances and potentially reducing unwanted electromagnetic radiation (EMC). Notch filters are typically used for stopping specific frequencies or passing specific frequencies.

Thus there is provided herein an apparatus for emitting both low and high frequency modulated signals in the form of coded light. Multiple problems surrounding the use of conventional LED luminaires and visible-spectrum LEDs are thus overcome as explained herein above. Example applications where such an apparatus may be useful include indoor lighting (e.g. home, work, supermarket, hotel, airport, etc.), where aspects to be considered include aesthetic design of luminaires as well as functional design. E.g. home lighting where style and appearance of the luminaire may be considered as important as the ability to function well as a high bandwidth data link. Similarly the typical practise of turning lights off at night rendering a visible-spectrum only based data link impractical. Example applications where such an apparatus may be useful include outdoor lighting, where aspects to be considered include lights that may be switched off during the day (e.g. street lamps, external building lighting etc.). By including infrared LEDs as high and low frequency modulated coded light sources these data links can still function during the daylight hours even though the visible-spectrum LEDs are switched off (not emitting light).

Impedance matching can be used to improve the power transfer between the driver-modulator subsystem 302, 304 and the LED module 200. That is to say, by matching the impedance between (a) the source subsystem formed of the driver 302 and modulator 304 (the subsystem that applies the data modulation onto the dc LED drive current) and (b) the LED board 200, including all parasitic impedances, then the amount of power transferred from the source subsystem 302,304 to the LED module 200 can be maximized.

Figure 5:
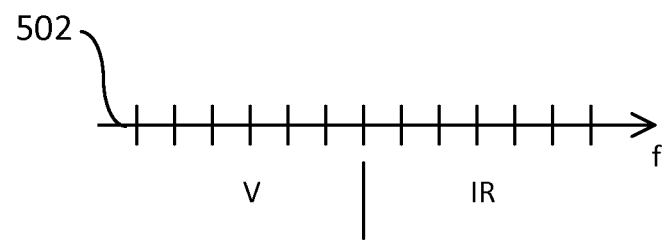

In embodiments the arrangement disclosed herein can be used to transmit an orthogonal frequency division multiplexing (OFDM) signal. In keeping with the known ODFM scheme, an OFDM signal is created with N subcarriers (e.g. 32, 64, or 128), which may have an extended bandwidth of up to e.g. 30-40 MHz. Note that this bandwidth refers to the frequency of the modulation, not the frequency of the light used. In embodiments disclosed herein the low frequency subcarriers of the carrier wave (e.g. 1-10 MHz) are created by the modulations in the visible light transmitted from the visible-light LED(s) 212, and the high frequency subcarriers (e.g. 11-30/40 MHz) are created by the modulations in the IR light transmitted from the IR LED(s) 204. This is done because the modulation bandwidth of the visible-spectrum (white) LED is small, limited to e.g. 5-6 MHz, compared to IR LEDs (e.g. ~30 MHZ). This is illustrated in FIG. 5, where the carrier frequency range is depicted from left to right representing low to high frequencies by the arrow 502 labelled T. The carrier frequency range is split into sub carriers, where low frequency subcarriers V, are used for transmitting the modulations for the visible-spectrum LED (s), and the high frequency subcarriers IR, are used for transmitting the modulations for the infrared LED(s). In embodiments, both the infrared and visible LEDs may modulate at a low frequency e.g. in the range of 2 KHz up to 200 KHz (i.e. for coded light indoor positioning), and the infrared LEDs may modulate at a high frequency, e.g. in the range of 1 MHz-30 MHz (or even up to e.g. 100 MHz) for VLC such as LiFi.

Hence at the receiver, the photodiode will give the output of the sum of frequency components, and the SNR will be maximize by using Hybrid LED engines.

Coded light can be used in a variety of possible applications. For instance a different respective ID can be embedded into the illumination emitted by each of the luminaires in a given environment, e.g. those in a given building, such that each ID is unique at least within the environment in question. E.g. the unique ID may take the form of a unique modulation frequency or unique sequence of symbols. This in itself can then enable any one or more of a number of applications. For instance, one application is to provide information from a luminaire to a remote control unit for control purposes, e.g. to provide an ID distinguishing it amongst other such luminaires which the remote unit can control, or to provide status information on the luminaire (e.g. to report errors, warnings, temperature, operating time, etc.). For example the remote control unit may take the form of a mobile user terminal such as a smartphone, tablet, smartwatch or smart-glasses equipped with a light sensor such as a built-in camera. The user can then direct the sensor toward a particular luminaire or subgroup of luminaires so that the mobile device can detect the respective ID(s) from the emitted illumination captured by the sensor, and then use the detected ID(s) to identify the corresponding one or more luminaires in order to control it/them (e.g. via an RF back channel). This provides a user-friendly way for the user to identify which luminaire or luminaires he or she wishes to control. The detection and control may be implemented by a lighting control application or "app" running on the user terminal.

In another application the coded light may be used in commissioning. In this case, the respective IDs embedded in the light from the different luminaires can be used in a commissioning phase to identify the individual illumination contribution from each luminaire.

In another example, the identification can be used for navigation or other location-based functionality, by mapping the identifier to a known location of a luminaire or information associated with the location. In this case, there is provided a location database which maps the coded light ID of each luminaire to its respective location (e.g. coordinates on a map or floorplan), and this database may be made available to mobile devices from a server via one or more networks such as a wireless local area network (WLAN) or mobile cellular network, or may even be stored locally on the mobile device. Then if the mobile device captures an image or images containing the light from one or more of the luminaires, it can detect their IDs and use these to look up their locations in the location database in order to estimate the location of the mobile device based thereon. E.g. this may be achieved by measuring a property of the received light such as received signal strength, time of flight and/or angle of arrival, and then applying technique such as triangulation, trilateration, multilateration or fingerprinting; or simply by assuming that the location of the nearest or only captured luminaire is approximately that of the mobile device. In some cases such information may be combined with information from other sources, e.g. on-board accelerometers, magnetometers or the like, in order to provide a more robust result. The detected location may then be output to the user through the mobile device for the purpose of navigation, e.g. showing the position of the user on a floorplan of the building. Alternatively or additionally, the determined location may be used as a condition for the user to access a location based service. E.g. the ability of the user to use his or her mobile device to control the lighting (or another utility such as heating) in a certain region or zone (e.g. a certain room) may be made conditional on the location of his or her mobile device being detected to be within that same region (e.g. the same room), or perhaps within a certain control zone associated with the lighting in question. Other forms of location-based service may include, e.g., the ability to make or accept location-dependent payments.

As another example application, a database may map luminaire IDs to location specific information such as information on a particular museum exhibit in the same room as a respective one or more luminaires, or an advertisement to be provided to mobile devices at a certain location illuminated by a respective one or more luminaires. The mobile device can then detect the ID from the illumination and use this to look up the location specific information in the database, e.g. in order to display this to the user of the mobile device. In further examples, data content other than IDs can be encoded directly into the illumination so that it can be communicated to the receiving device without requiring the receiving device to perform a look-up.

It will be appreciated that the above embodiments have been described only by way of example. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An LED module comprising:
    a pair of terminals for receiving power;
    a first set of multiple LEDs for emitting illumination to illuminate an environment, arranged within a first circuit path of the LED module and powered to emit said illumination by a first portion of the power received via said terminals;
    a second set of one or more LEDs for emitting light, arranged within a second circuit path of the LED module and powered to emit said light by a second portion of the power received via said pair of terminals, the first circuit path being longer than the second circuit path; and
    filter circuitry arranged to filter a modulation in the power received via said terminals;

wherein the filter circuitry is configured to allow a first component of said modulation at a predetermined modulation frequency to be passed only to the LEDs of the second set and not the LEDs of the first set, thereby causing a corresponding first signal to be embedded in the light emitted by the second set but not in the illumination emitted by the first set characterized in that the first set of LEDs are visible-spectrum LEDs configured to emit visible-spectrum illumination; and wherein the second set of LEDs are infrared LEDs configured to emit infrared light.

2. The LED module of claim 1, wherein the filter circuitry is configured to:

allow a second component of the modulation with a first, lower modulation frequency to be passed at least to the LEDs of the first set, thereby causing a corresponding second signal to be embedded in the emitted illumination and wherein the first component has a second, higher modulation frequency.

3. The LED module of claim 1, wherein the first set of LEDs are phosphor-converted LEDs; and wherein the second set of LEDs are non-phosphor-converted LEDs.

4. The LED module of claim 2, wherein the filter circuitry is configured to allow the second, lower-frequency component to be passed to the first set of LEDs but not the second set of LEDs, such that the second signal is not transmitted via the light emitted by the second set.

5. The LED module of claim 2, wherein the filter circuitry is configured to allow the second, lower-frequency component to be passed to both the first and second sets of LEDs, such that the second signal is embedded in the illumination emitted by the first set of LEDs and transmitted via the light emitted by the second set of LEDs.

6. The LED module of claim 1, wherein the visible-spectrum LEDs are white LEDs.

7. An illumination device comprising:

the LED module of claim 1;

an LED driver arranged to supply said power;

and a modulator coupled to the LED driver and arranged to introduce said modulation into the supplied power, the terminals of the LED module being connected to the modulator to receive the modulated power therefrom.

8. The illumination device of claim 7, wherein the modulator is arranged to include the first and second components in said modulation at the same time such that the first and second signals are transmitted simultaneously.

9. The illumination device of claim 7, wherein the modulator is arranged to include the first component in said modulation at a different time than the second component, such that the first and second signals are emitted on different occasions.

10. The illumination device of claim 7, wherein the modulator is configured to continue supplying the first, higher-frequency component to the LED module when the visible spectrum LEDs are switched off.

11. The illumination device of claim 10, wherein the modulator is configured to use the visible-spectrum and infrared LEDs to implement an orthogonal frequency division multiplexing channel comprising a set of subcarriers, by using the visible spectrum LEDs to transmit a first, lower-carrier-frequency group of the subcarriers comprising the second signal, and using the infrared LEDs to transit over a second, higher-carrier-frequency group of the subcarriers comprising the first signal, the first and second signals being sub-signals of the orthogonal frequency division multiplexing channel.

12. A system comprising the illumination device of claim 7, further comprising receiving equipment, wherein the receiving equipment comprises:

a first light sensor for sensing visible-light modulations and a second light sensor for sensing infrared light modulations, wherein the first light sensor is capable of sensing a lower maximum modulation frequency than the second light sensor; and a decoder coupled to the one or more light sensors, the decoder being configured to decode the second signal from the sensed visible-light modulations and to decode the first signal from the sensed infrared light modulations.

13. The system of claim 12, wherein the first light sensor takes the form of a camera for capturing images, whereas the second light sensor takes the form of a dedicated infrared data receiver.

* * * * *